UNITED STATES PATENT OFFICE.

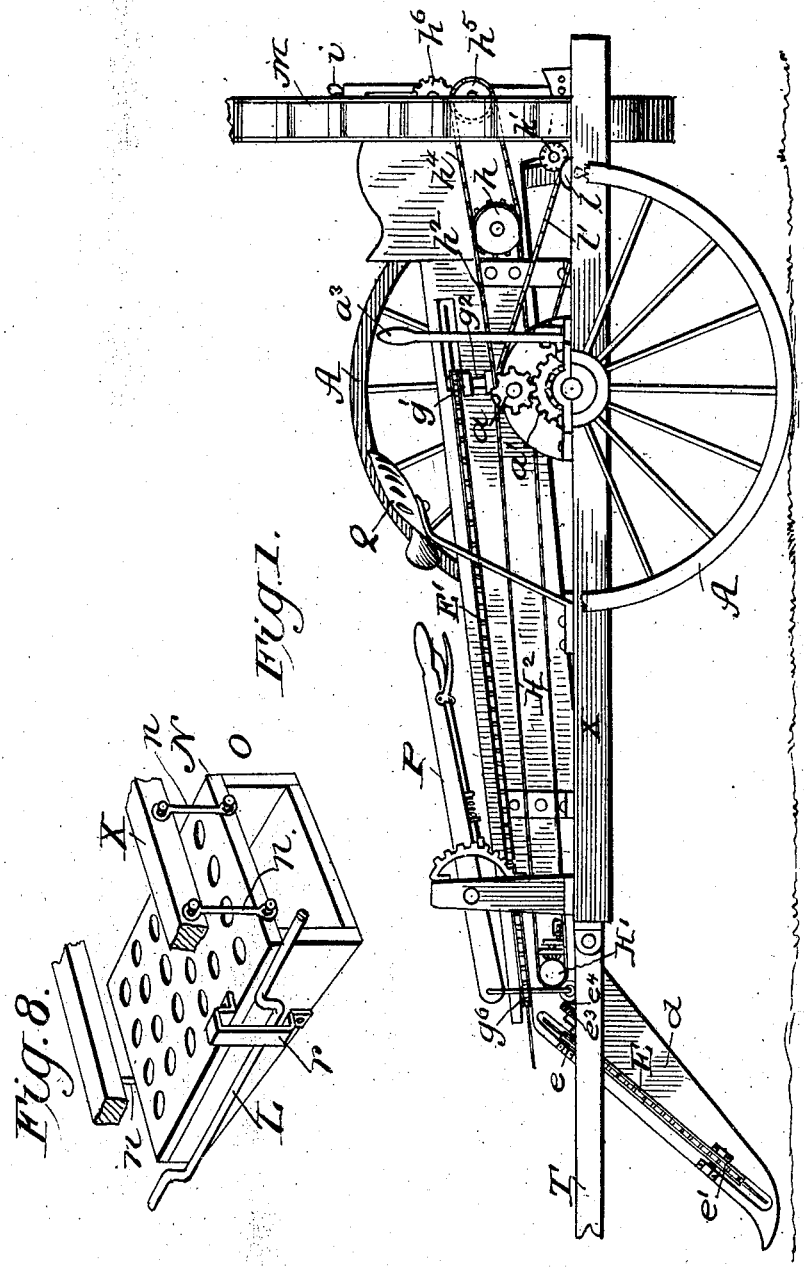

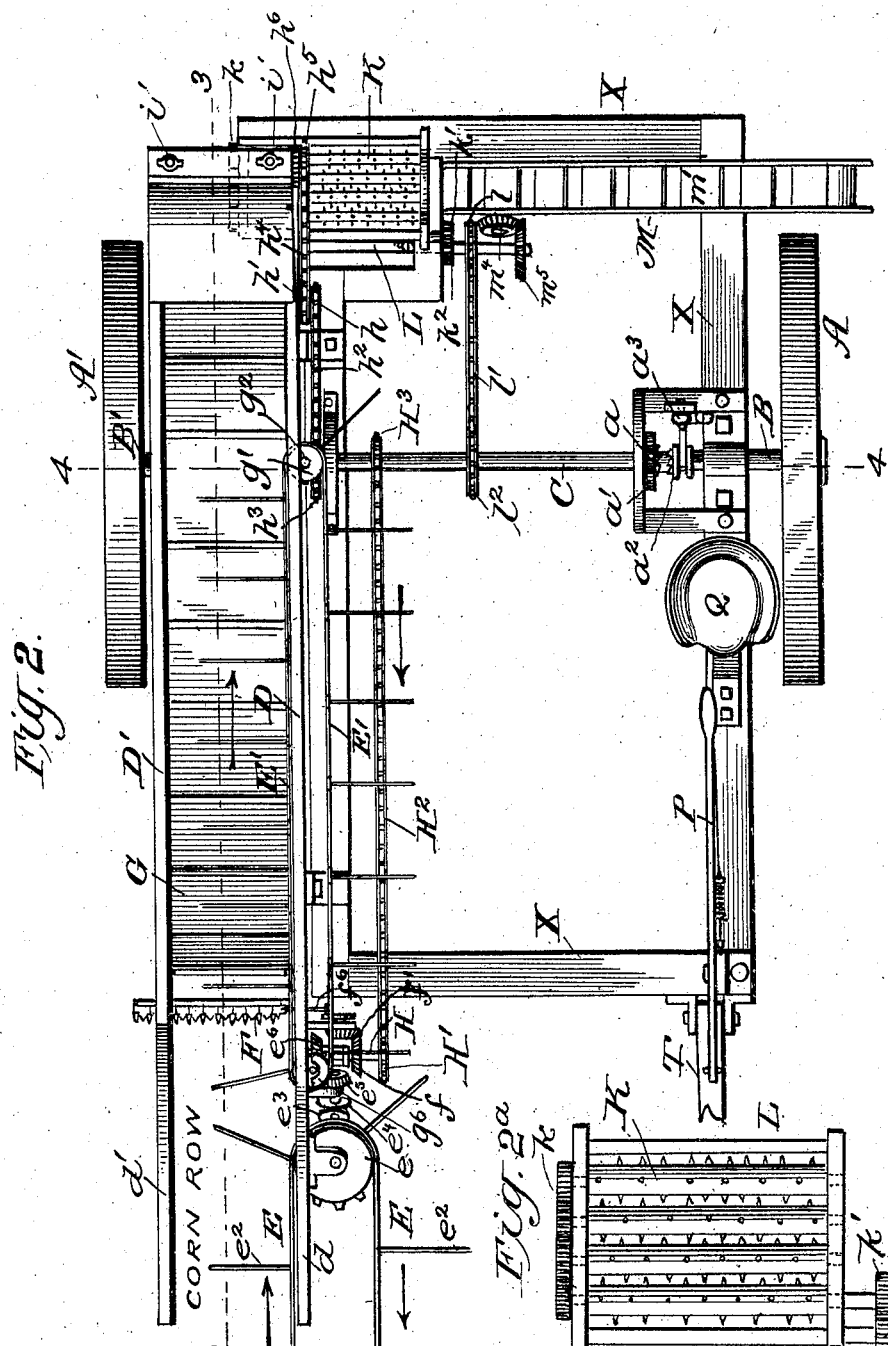

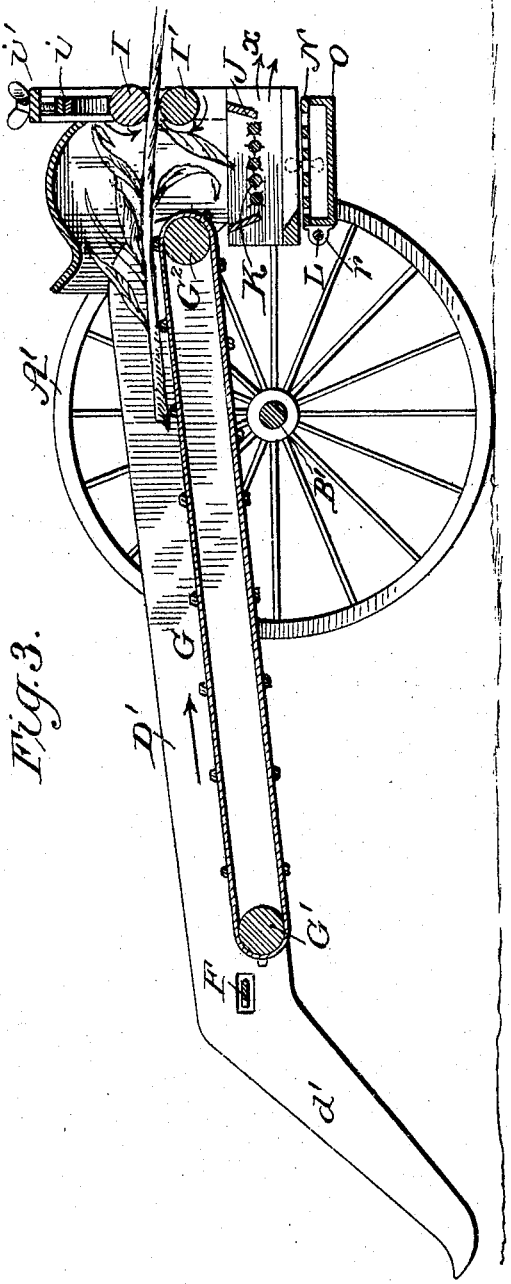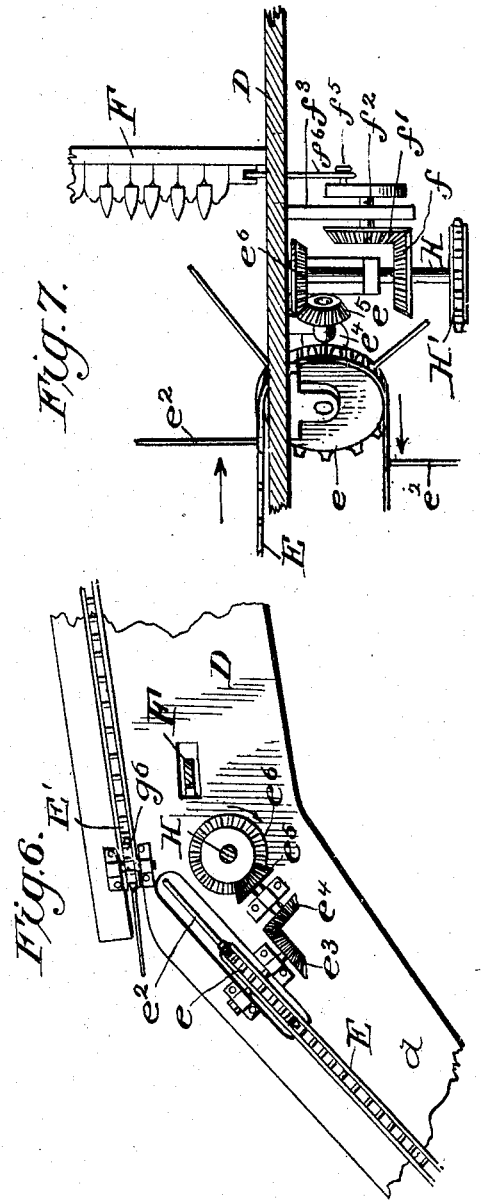

PHILIP FLEMING, OF BURTON VIEW, ILLINOIS.

CORN HARVESTER AND HUSKER.

No. 800,094.  Specification of Letters Patent.  Patented Sept. 19, 1905.

Application filed March 24, 1905. Serial No. 251,837.

*To all whom it may concern:*

Be it known that I, PHILIP FLEMING, a citizen of the United States, residing at Burton View, in the county of Logan and State of Illinois, have invented a new and useful Improvement in Corn Harvesters and Huskers, of which the following is a specification.

The object of my invention is to provide a machine which is adapted to enter a corn-field and to harvest or cut off the stalks of corn and at the same time strip the ears from the stalks, take the husk off the ear, and to save any shattered grains of corn which may be shelled off in the operation of husking, all of said operations to be continuously performed by the draft of the team in drawing the machine across the field.

My invention consists in the novel construction and arrangement of the various parts of the machine, which I will now proceed to describe with reference to the drawings, in which—

Figure 4:
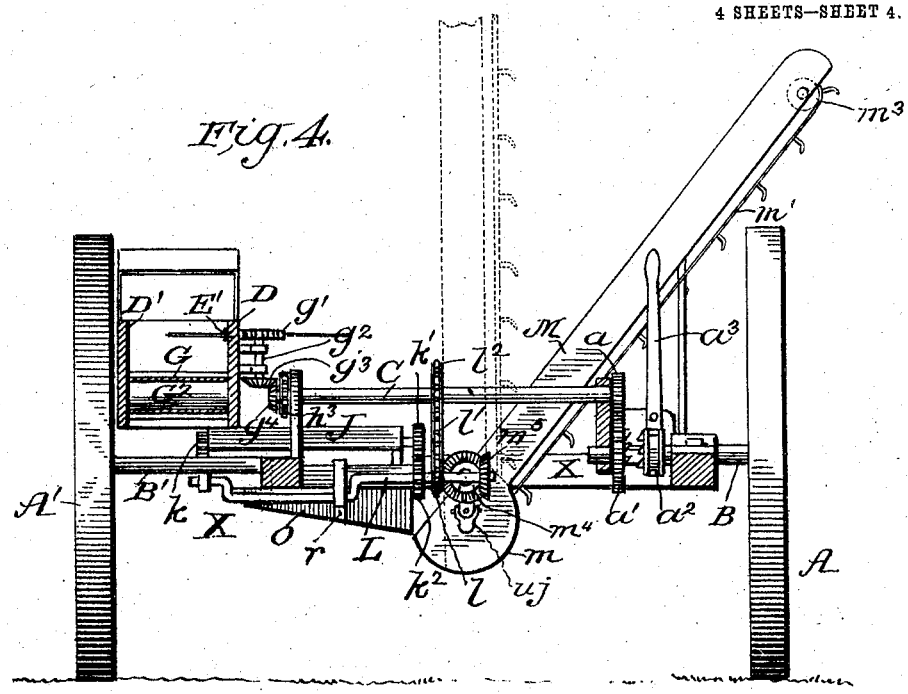
Figure 5:
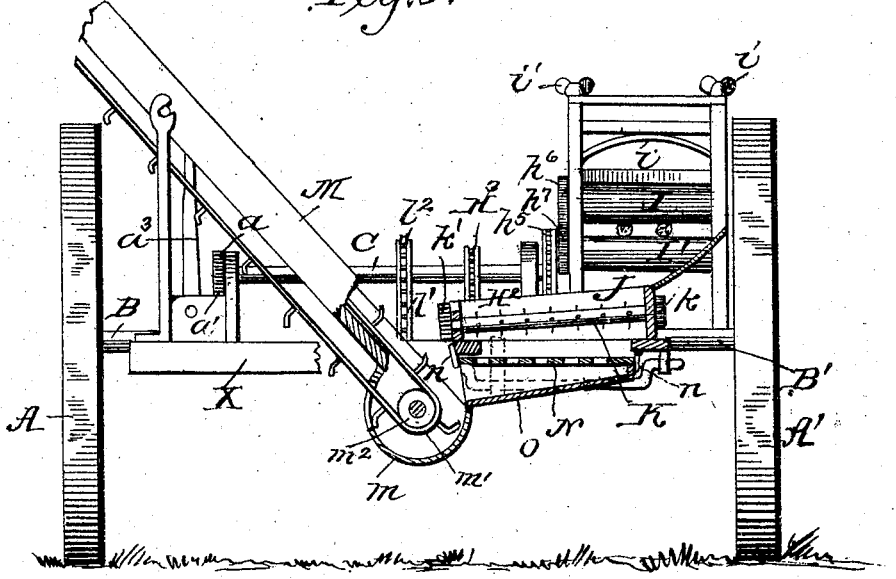

Figure 1 is a side elevation of the machine with the upper part of the near wheel broken away to show the parts behind it. Fig. 2 is a top plan view, partly broken away on the left-hand side. Fig. $2^a$ is a detail plan view of the husking-rollers and their gears. Fig. 3 is a vertical longitudinal section taken through the carrier on line 3 3 of Fig. 2. Fig. 4 is a vertical transverse section on line 4 4 of Fig. 2 looking from front to rear of the machine. Fig. 5 is a rear end elevation, partly in section. Fig. 6 is an enlarged detail of the driving mechanism for the stalk-feed shown in side view. Fig. 7 is a sectional detail, in plan view, of the sickle-driving mechanism; and Fig. 8 is a perspective detail view of the means for separating and saving the grains of corn.

In the drawings, A and A' represent the running wheels, mounted on independent short axles B and B'. The wheel A is rigidly fixed to and rotates with its axle B, while A' turns loose on its axle B', which latter is rigidly fixed to the rectangular framework X.

The wheel A is the driving-wheel for the various parts of the machinery, and the axle of this wheel is geared to a horizontal transverse shaft C. This shaft C is located a little above the level of the wheel-axles and constitutes the main driving-shaft through which all the working parts of the machine are operated. Between the axle of the wheel A and the shafts C, Figs. 1, 2, and 4, there are interposed two gear-wheels $a$ and $a'$. The gear-wheel $a$ is a small one, rigidly fixed to the end of shaft C and meshing with and deriving motion from the larger gear-wheel $a'$ below, which latter is loose on the axle B, but may be rigidly connected to it by a clutch $a^2$, operated by a hand-lever $a^3$ in a well-known way.

On the opposite side of the machine from the driving-wheel A is located the stalk gathering, cutting, and carrying mechanism. This consists of two parallel side bars D D', arranged longitudinally to the line of draft, and which side bars are fixed on the main frame at a slight inclination, their rear ends being the highest, while the front ends $d$ $d'$ are bent at an obtuse angle downward, Figs. 1 and 3, and approach within a few inches of the ground. The row of cornstalks is received between the two downwardly-projecting extensions $d$ $d'$, and all inclined or fallen stalks are lifted up and fed to a cutter above by an endless spiked chain E, Figs. 1, 2, and 6, running over sprocket-wheels $e$ $e'$ and whose spikes or fingers $e^2$ extend part or all the way across the space between the two bars $d$ $d'$. The cornstalk-cutter consists of a sickle F, Figs. 2 and 7, playing between finger-bars like those of a mower, except that they are stouter and more widely spaced. This sickle occupies a position near the top of the spiked chain E and extends across the space between the two side bars D D'. At the upper end of the spiked chain E a second spiked chain E' receives the stalks and presses them against the cutter, and after the tops are cut off just below the ears of corn delivers said upper portions of the stalks onto an endless slatted carrier-belt G, Figs. 2 and 3, running between the side bars D D' and forming a floor, being distended over rollers G' $G^2$, one of which is located just behind the cutter and the other of which is near the rear end of the side bars.

The spiked chain E, which straightens up the fallen stalks, is driven from its upper sprocket-wheel $e$ as follows, reference being had to Figs. 6 and 7: On the shaft of the said upper sprocket-wheel $e$ is fixed a bevel-wheel $e^3$, which engages another bevel-wheel $e^4$ on a short shaft bearing another bevel-wheel $e^5$ and which latter engages a bevel-wheel $e^6$ on a horizontal shaft H, journaled in an offsetting arm from the side bar D. This shaft H bears at its outer end a sprocket-wheel H', which by a chain belt $H^2$ (see Fig. 2) receives motion from a sprocket-wheel $H^3$, keyed to the main drive-shaft C.

For driving the sickle-bar the shaft H (see Fig. 7) is provided with a bevel-gear $f$, which turns a bevel-gear $f'$ on a shaft $f^2$, journaled in the stationary arm $f^3$, and this shaft bears a crank or wrist pin $f^5$, which through a pitman $f^6$ imparts motion to the sickle-bar F, which slides in guides in the side bars D D'.

The spiked chain E' (see Figs. 1 and 2) is distended about a sprocket-wheel $g^6$, journaled in the front end of the side bar D and another sprocket-wheel $g'$ at the rear, which latter is fixed to the upper end of an upright shaft $g^2$, Fig. 4, journaled in bearings on the side bar D. To the lower end of this shaft is keyed a bevel gear-wheel $g^3$, which is engaged by a bevel gear-wheel $g^4$ on the main drive-shaft C, the latter gears forming means for driving the upper spiked chain E'.

The carrier-belt G receives the cut-off upper ends of the stalks and takes them to the stripper, which tears the ears off the stalks. This stripper consists of two rollers I I', Fig. 3, between which the stalks are allowed to pass, but which rollers are set close together with a spring-pressure which will not allow the ears to pass, and consequently strips off the ears from the stalks while the latter are passed through and discharged at the rear end of the machine. The bearings of the upper stripper-roller are pressed down by a spring $i$, whose tension on the rollers is regulated by set-screws $i''$.

To drive the carrier-belt and stripper-rollers, there is rigidly attached to the shaft of the upper carrier-roller $G^2$ two sprocket-wheels $h$ and $h'$. (See Figs. 1 and 2.) One of these gear-wheels receives motion from a chain belt $h^2$, connecting with a sprocket-wheel $h^3$ on the main shaft C, while a second chain belt $h^4$ connects the other sprocket-wheel $h'$ with a sprocket-wheel $h^5$, Fig. 1, on the shaft of the lower stripping-roller I'. This lower stripping-roller is geared to the upper stripping-roller by intermeshing gears $h^6$ $h^7$. (Seen in Fig. 5.)

When the ears are stripped off from the stalks, (see Fig. 3,) these ears are discharged into a hopper J and are then acted upon by the husking-rolls K. There are a number of these rolls, whose surfaces are covered with short spikes. These husking-rolls are below the stripping-rollers and parallel to the same and to the main drive-shaft C, from which latter they receive their power. These husking-rollers are geared together for positive revolution by means of intermeshing gear-wheels $k$ at their outer ends, Figs. $2^a$ and 5, and they are all driven together from a gear-wheel $k'$ on the inner end of the front roller, Fig. 2, which receives motion from a gear-wheel $k^2$, Fig. 4, on a shaft L, journaled in the framework below the rollers in parallel position thereto. This shaft L bears a sprocket-wheel $l$, which through a chain belt $l'$, Figs. 2 and 4, receives motion from a sprocket-wheel $l^2$ on the main driving-shaft C in front.

The husking-rollers are set at a slight incline with the inner ends, the lower, as seen in Fig. 5, and when the ears of corn are delivered onto the same the spikes on the rollers tear off the husks and pass them through between the rollers, while the clean ears of corn are delivered by reason of the incline of the rollers over the lower edge of the hopper into the elevator M, which raises them and discharges them into a wagon. This elevator consists of a long trough having a shoe $m$ at the bottom and an endless belt $m'$ with buckets, which belt runs along the bottom of the trough, passing around a lower pulley $m^2$ in the shoe and an upper one $m^3$, Fig. 4, at or near the top of the trough. This elevator-trough is pivoted on the shaft of the lower pulley $m^2$, so that it may be turned inwardly out of the way, as shown in dotted lines in Fig. 4, when not in use. This elevator-trough may also be made in hinged and folding sections, if desired.

To drive the elevator-belt, a bevel-gear $m^4$, Figs. 2 and 4, is keyed to the shaft of the lower pulley $m^2$ and receives motion from a bevel-gear $m^5$ on the shaft L. The shaft connecting gear $m^4$ to the lower elevator-pulley $m^2$ is provided with a universal joint $u$ $j$, as seen in Fig. 4.

Just beneath the husking-rollers is arranged a perforated screen N, Figs. 3 and 5, and the husks or corn-caps which are discharged from the rollers drop down upon the screen and are discharged over the rear edge of the same, as shown by arrows $x$ in Fig. 3, while any shattered corn that may have become detached in husking passes through the screen into a subjacent chute O below it, which chute has the same inclination as the husking-rollers, as seen in Fig. 5, and discharges into the shoe at the lower end of the elevator-trough, the grains being carried up by the buckets of the elevator-belt along with the ears of corn and delivered into the wagon. The perforated screen N and subjacent chute O are connected together and are suspended by hangers $n$ $n$, Fig. 8, from the framework, and to facilitate the separation of the corn-caps from the shattered corn and the passage of the latter through the screen and into the shoe of the elevator a shaking motion is given to said screen and chute, and this is effected by forming a double-cranked bend in the shaft L and allowing this bent portion of the shaft to play loosely in the keeper $r$, attached to said chute, so that the revolution of this crank-shaft shakes the chute and screen.

T, Figs. 1 and 2, is the tongue of the machine, on opposite sides of which the horses are connected to the machine by suitable draft attachments, a previously-cut row of corn-stalks being between the horses. This tongue is hinged to the main frame, and a lever P, with lifting-link and locking device, permits the machine to be tilted on its axle to the proper inclination.

Q is the driver's seat, located on the main frame near the drive-wheel A and within easy reach of the tongue-adjusting and clutch-adjusting levers, and also giving weight on this side to balance the machine.

I am aware that spiked chain belts have been heretofore employed to carry the cornstalks to a transversely-arranged sickle, and I do not claim this broadly. I am also aware that the stripping-rollers and husking-rollers have been employed in a different arrangement and that provision has been made for saving the shattered corn. The construction and arrangement shown and described embody various novel and important features in a corn harvester and husker, which I claim as my invention, as hereinafter set forth.

Having thus described my invention, what I claim as new, and desire to secure by Letters Patent, is—

1. A corn harvester and husker, comprising a main frame with running wheels, two parallel side bars arranged longitudinally in the line of draft and having downwardly-extending forward ends, an endless spiked chain arranged in one of said downward extensions, a second endless spiked chain arranged in one of the side bars, a sickle arranged transversely in the side bars near the front ends of the same, a longitudinally-running belt-carrier arranged between the side bars, a pair of stripping-rollers arranged transversely to the direction of movement of the belt-carrier at the delivery end of the same, and gears for operating all of said parts substantially as described.

2. A corn harvester and husker, comprising a main frame with running wheels, two parallel side bars arranged longitudinally to the line of draft and having downwardly-extending forward ends, an endless spiked chain arranged in one of said downward extensions, a second endless spiked chain arranged in one of the side bars, a sickle arranged transversely in the side bars near the front ends of the same, a longitudinally-running belt-carrier arranged between the side bars, a pair of stripping-rollers arranged transversely to the direction of movement of the carrier at its delivery end, a series of husking-rollers arranged below the stripping-rollers transversely to the line of draft and gears for operating all of said parts substantially as described.

3. A corn harvester and husker, comprising a main frame with running wheels, two parallel side bars arranged longitudinally to the line of draft and having downwardly-extending forward ends, an endless spiked chain arranged in one of said downward extensions, a second endless spiked chain arranged in one of the side bars, a sickle arranged transversely in the side bars near the front ends of the same, a longitudinally-running belt-carrier arranged between the side bars, a pair of stripping-rollers arranged transversely to the direction of movement of the carrier at its delivery end, a series of husking-rollers arranged below the stripping-rollers transversely to the line of draft, said rollers being set at an incline descending toward the middle of the machine, a transverse elevator-trough with carrier-belt having one end extending below the husking-rollers and its other end rising above the other side of the machine, and gears for operating all of said parts substantially as described.

4. A corn harvester and husker, comprising a main frame with running wheels, two parallel side bars arranged longitudinally in the line of draft and having downwardly-extending forward ends, an endless spiked chain arranged in one of said downward extensions, a second endless spiked chain arranged in one of the side bars, a sickle arranged transversely in the side bars near the front ends of the same, a longitudinally-running belt-carrier arranged between the side bars, a pair of stripping-rollers arranged transversely to the direction of movement of the belt-carrier at the delivery end of the same, a series of husking-rollers set at an incline to the horizontal below the stripping-rolls, a screen located below the husking-rollers, an inclined chute arranged below the screen and gears for operating all of said parts, substantially as described.

5. A corn harvester and husker, comprising a main frame with running wheels, two parallel side bars arranged longitudinally in the line of draft and having downwardly-extending forward ends, an endless spiked chain arranged in one of said downward extensions, a second endless spiked chain arranged in one of the side bars, a sickle arranged transversely in the side bars near the front ends of the same, a longitudinally-running belt-carrier arranged between the side bars, a pair of stripping-rollers arranged transversely to the direction of movement of the belt-carrier at the delivery end of the same, a series of husking-rollers set at an incline to the horizontal below the stripping-rolls, a screen located below the husking-roller, an inclined chute arranged below the screen, an elevator with its lower end arranged to receive both the ears of corn from the husking-rollers and the shattered grains from the chute and gears for operating all of said parts, substantially as shown and described.

6. A corn harvester and husker comprising a main frame, a rigid axle with a loose supporting-wheel on one side, a rotating axle with a rigidly-attached supporting-wheel on the other side, a main transverse drive-shaft, gears connecting one end of it to the rotating axle, a clutch for controlling these gears, two parallel side bars arranged on the opposite side of the machine from the driving-wheel and having downward extensions at the front end, a spiked endless chain arranged in one of these downward extensions, a second spiked endless chain arranged in one of the side bars, a transverse sickle arranged near the junction of the two chains, an endless carrier-belt arranged between the side bars, a pair of stripping-rollers arranged at the rear end of the carrier-belt, husking-rollers located below the stripping-rollers, and gears connecting all of said driven parts to the main transverse drive-shaft, substantially as described.

<div style="text-align:right">PHILIP FLEMING.</div>

Witnesses:
  W. A. Lucas,
  A. D. Cadwallader.